United States Patent
King

(10) Patent No.: US 8,025,480 B1
(45) Date of Patent: Sep. 27, 2011

(54) WIND TURBINE BLADES WITH AVIAN AVOIDANCE SURFACES

(75) Inventor: George R. King, The Woodlands, TX (US)

(73) Assignee: Weldon W. Alders, Midway, TX (US)

( * ) Notice: Subject to any disclaimer, the term of this patent is extended or adjusted under 35 U.S.C. 154(b) by 777 days.

(21) Appl. No.: 11/760,334

(22) Filed: Jun. 8, 2007

(51) Int. Cl.
  *F03D 11/00* (2006.01)
(52) U.S. Cl. .......................... 416/5; 416/230
(58) Field of Classification Search .......... 416/5, 229 R, 416/230, 236 R
  See application file for complete search history.

(56) References Cited

U.S. PATENT DOCUMENTS

| | | |
|---|---|---|
| 591,775 A | 10/1897 | Peterson |
| 1,352,960 A | 9/1920 | Heyroth |
| 2,701,540 A | 2/1955 | Hamilton |
| 4,049,362 A | 9/1977 | Rineer |
| 4,486,143 A | 12/1984 | McVey |
| 4,551,631 A | 11/1985 | Trigilio |
| 5,126,584 A | 6/1992 | Ouellet |
| 5,171,127 A | 12/1992 | Feldman et al. |
| 5,183,386 A | 2/1993 | Feldman et al. |
| 6,259,233 B1 | 7/2001 | Caamano |
| 6,402,472 B1 | 6/2002 | Hogue et al. |
| 6,623,243 B1 | 9/2003 | Hodos |
| 6,641,366 B2 | 11/2003 | Nordhoff |
| 6,887,031 B1 | 5/2005 | Tocher |
| 6,942,454 B2 | 9/2005 | Ohlmann |
| 6,945,752 B1 | 9/2005 | Wobben |
| 2003/0137149 A1 | 7/2003 | Northrup et al. |
| 2003/0227174 A1 | 12/2003 | Bayly |
| 2004/0041408 A1 | 3/2004 | Casazza |
| 2004/0041409 A1 | 3/2004 | Gabrys |
| 2004/0222756 A1 | 11/2004 | Crookes |
| 2005/0052880 A1 * | 3/2005 | Buckingham et al. ........ 362/471 |

FOREIGN PATENT DOCUMENTS

| | | |
|---|---|---|
| DE | 19636591 | 3/1998 |
| DE | 10140516 | 3/2003 |
| WO | WO 2006011990 A2 * | 2/2006 |

* cited by examiner

Primary Examiner — Edward Look
Assistant Examiner — Jesse Prager
(74) Attorney, Agent, or Firm — Egbert Law Offices PLLC

(57) ABSTRACT

A blade for a wind turbine has a surface with a first color band and a second color band and a third color band thereon in spaced relationship to each other. A luminescent band extends in the space between said first, second and third color bands. The first, second and third color bands are of different colors. The luminescent band extends around a periphery of each of first, second and third color bands. The first color band is a red color. The second color band is a white color. The third color band is a blue color.

9 Claims, 1 Drawing Sheet

WIND TURBINE BLADES WITH AVIAN AVOIDANCE SURFACES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to wind turbines. More particularly, the present invention relates to wind turbine that have colors thereon so as to enhance the avian avoidance capability of such wind turbine. Additionally, the present invention relates to blades of wind turbines having colors formed thereon.

2. Description of Related Art

Including Information Disclosed Under 37 CFR 1.97 and 37 CFR 1.98.

The development of windpower is source for the generation of electricity has led to the establishment of wind farms where multiple wind turbines are erected. Although wind turbines are environmentally safe, the wind turbines are reported to be hazardous to flying birds. The birds cannot effectively see the wind turbines when they are rotating. As such, they will fly into the moving turbines and can be maimed or killed.

Motion smear is the degradation of the visibility of rapidly moving objects that results in the inability of the retina of the eye to process the high temporal frequencies of stimulation that result from high velocities of retinal-image motion. In the case of wind turbines, motion smear occurs primarily at the tips of the blades. This makes them deceptively transparent at high-retinal image velocities. Attempts to minimize motion smear has taken to account its cause and attempts to reduce the temporal frequency of stimulation of the retina. Anti-motion smear patterns are designed to do this by not repeating the pattern in one location on a turbine blade at the same location on any other blade. In a three-blade turbine, the temporal frequency of stimulation is thereby reduced by a factor of three.

In birds, the rod and cone patterns of the retina are much greater than that in humans. As such, at nighttime, birds possess four to six times the ability of humans to distinguish color and to see objects. With wind turbine blades, the blades are typically canted at an angle with respect to the hub. As such, if the birds approaches the blades at an angle, it becomes very difficult to see the rotating blades.

Data has shown that anti-motion smear patterns produce a higher pattern electroretinogram amplitude from the retina. This translates into a higher pattern visibility at a given distance. For example, at a retinal velocity of 120° of visual angle/sec, the most effective anti-motion smear patterns produce pattern electroretinogram amplitudes that are three times the amplitude of the blade with no patterns. A single, solid black blade, when paired with two white blades, is one with the most visual stimulus because it may stimulate a larger area of the retina than striped blades. Even though these anti-motion smear patterns are more visible at a distance of approximately of 25 meters than blank blades or blades within unstaggered, repeating patterns, as the bird gets closer the blades, the retina is unable to process the progressively higher retinal-image velocities and all patterns rapidly lose visibility with decreasing distance.

U.S. Pat. No. 6,623,243, issued on Sep. 23, 2003 to W. Hodos, describes a method and apparatus for reducing avian collisions with wind turbines. A design or pattern is placed on the rotor blades of a wind turbine for reducing the motion smear of the image of the rotor blades on the bird's retina. When the motion smear on the bird's retina is reduced, the bird is capable of detecting the presence of the rotor blades more easily. This allows the bird to re-direct its flight path and avoid colliding with the wind turbine. In this patent, the design principle is that a pattern placed in a given location on one rotor blade is not repeated in the same location on any other rotor blades on the wind turbine. Although this provides an improved approach for avoiding avian collisions, ultimately, the patterns on the blades will tend to blend with one another so that the bird will perceive no difference between the separate colors. This arrangement provides no depth image to the bird and, as such, is not very effective at preventing collisions. In other words, as the blades rotate, a relatively smooth pattern ultimately develops as the blades spin rather rapidly. The bird will perceive not "chopping" between the separate blades and, as such, is not able to redirect its flight in the manner desired.

U.S. Pat. No. 6,945,752, issued on Sep. 20, 2005 to Wobben, describes a windpower generator in which the rotor blade includes a rotor blade connection and a rotor blade tip with a surface that is arranged therebetween. The surface is divided into at least two regions which differ with respect to lightness. The lighter regions are arranged closer to the rotor blade connection than the darker region. The darker region is of a natural shade and/or daylight sky shade.

U.S. Pat. No. 2,701,540, issued to Hamilton, describes the application of fluorescent paint to a propeller as integrated with a spiral stripe located on the propeller blade. The fluorescent material allows the blade to be more easily seen under nighttime conditions. The propeller is used in association with a bicycle.

U.S. Pat. No. 6,887,031, issued to Tocher, describes a habitat friendly wind energy generator. Large diameter concentrator wings capture and extract energy from a large area of the wind relative to the frontal area of the turbine shroud. At the same time, the wings presents a highly noticeable object to birds in flight. The concentrator wings are made more noticeable by the application of contrast in colors, shades or patterns made on these elements for installation of the embodiments of the wind energy generator within relatively featureless landscapes, such as prairies or deserts. The use of the markings and colorings also serves to improve the blending within other highly textured natural landscapes while minimizing hazards to birds in flight. It is desired that the wind turbines visually blend with the forest landscape.

U.S. Pat. No. 6,641,366, issued to Nordhoff, describes a windpower generating system with an obstruction lighting or night marking device. The blade includes insertion areas that have partial fiberoptical bundles integrated into their composite fiber material. These integrated partial optical fiber bundles result from an inner face arranged in the frontal area of the rotor blade. Light can be projected through these optical fiber bundles so as to allow the blade to be observed in nighttime conditions.

It is an object of the present invention to provide a blade for a wind turbine that serves to intensify color separation on the blades.

It is a further object of the present invention to provide a blade for a wind energy generator that enhances the red/blue color shift in the eyes of the birds.

It is a further object of the present invention to provide a blade for a wind turbine that enhances parallax with color, shape and movement.

It is a further object of the present invention to provide a blade for a wind energy generator that presents a chopping effect to the eyes of the bird.

It is still another object of the present invention to provide a blade for a wind turbine that can be observed by a bird flying at a sharp angle with respect to the blades.

It is sill another object of the present invention to provide a blade for a wind turbine that is easy to implement and relatively inexpensive.

These and other objects and advantages of the present invention will become apparent from a reading of the attached specification and appended claims.

BRIEF SUMMARY OF THE INVENTION

The present invention is a blade for a wind turbine that comprises a surface having a first color band, a second color band and a third color band thereon. A space exists between the first color band and the second color band. Another space exists between the second color band and the third color band. A luminescent band extends in the spaces between the first, second and third color bands. The first color band is of a different color than that of the second color band and the third color band. The second color band is of a different color than the third color band. In particular, the first color band can be of a red color. The second color band is of a white color. The third color band is of a blue color. The second color band has the same width as either of the first color band or the third color band. The luminescent band extends around a periphery of each of the first, second and third color bands from the tip to the base of the blade. The luminescent band can have a width of between 1/32 inch and 3/4 inch. In the preferred embodiment of the present invention, the luminescent band is a thread affixed to the surface of the blade. This luminescent band will extend tangentially relative to a circumference of the blade.

The present invention is also a wind turbine apparatus that has a first blade with first, second and third color bands thereon, a second blade with the first, second and third color bands thereon, and a third blade having the first, second and third color bands thereon. A first luminescent band is positioned between the first and second color bands of the first, second and third blades. A second luminescent band is positioned between the second and third color bands of the first, second and third blades. The first luminescent band extends around the periphery of each of the first, second and third blades. The second luminescent band extends around a periphery of the first, second and third blades. A hub has the first, second and third blades extending radially outwardly therefrom. The first color band of the first, second and third blades is spaced by an equal distance from the hub. The second color band of the first, second and third blades is spaced by an equal distance from the hub. The third color band of the first, second and third blades is spaced by an equal distance from the hub. Each of the luminescent bands is of a white luminescent material. Each of the color bands has an equal width.

DETAILED DESCRIPTION OF THE INVENTION

Figure 1:
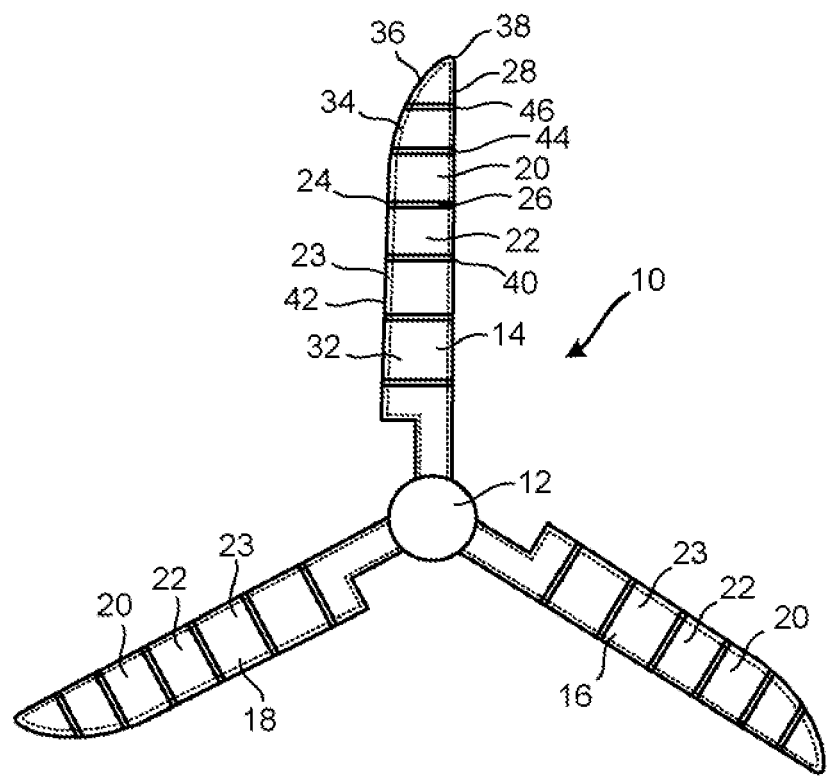
FIG. 1 is a frontal view showing the wind turbine apparatus of the present invention.

Referring to FIG. 1, there is shown the wind turbine apparatus 10 in accordance with teachings of the present invention. The wind turbine apparatus 10 includes a hub 12 having a first blade 14, a second blade 16 and a third blade 18 extending radially outwardly therefrom. Each of the blades 14, 16 and 18 is canted with respect to the hub 12 so as to receive the force of the wind thereon for the rotation of the hub 12 and the generation of electrical energy from a turbine associated with the hub 12.

In the present invention, each of the blades 14, 16 and 18 has a unique arrangement of color bands thereon. The blade 14 has a first color band 20, a second color band 22 and a third color band 23. The first color band 20 is of a different color than the color of the second color band 22 and the third color band 23. In the preferred embodiment of the present invention, the first color band 20 is of a red color. The second color band 22 is of a white color the third color band 23 is of a blue color. Importantly, there is a space 24 between the first color band 20 and the second color band 22. This space 24 can expose the white color of the blade 14 or can have a luminescent band 26 affixed thereto and between the first color band 20 and the second color band 22. A luminescent band 28 also extends around the periphery of the blade 14. The luminescent bands 26 and 28 can have a width of between 1/32 inch and 3/4 inch. In the preferred embodiment of the present invention, the luminescent bands 26 and 28 are luminescent threads that affixed to the surface of the blade 14. The luminescent band 26 will extend generally tangentially relative to a circumference of the blade 14. Preferably, the luminescent bands 26 and 28 are of a white luminescent material.

As can be seen in FIG. 1, the color bands extend across the surface of the blade 14. The third color band 23 is positioned on a side of the second color band 22 opposite to the first color band 20. Another color band 32 is positioned on a side of the third color band 22 opposite to the second color band 22. This color band 32 would be of a red color. Another color band 34 is formed on the surface of the blade 14 on a side of the first color band 20 opposite to the second color band 22. Color band 34 would be of a blue color. Another color band 36 is formed on the tip 38 of the blade 14 on a side of the color band 34 opposite to the first color band 20. Color band 34 would be of a blue color. The various color bands 20, 22, 30, 32, 34 and 36 should be of alternating colors. In the preferred embodiment, these alternating colors should be of red, white and blue. A luminescent band 40 will extend between the color bands 22 and 23. A luminescent band 42 will extend between the bands 30 and 32. A luminescent band 44 extends between the bands 20 and 34. Another luminescent band 46 will extend between the bands 34 and 36.

Although six bands are illustrated in FIG. 1 on the blade 14, it should be noted that a fewer number of bands or a larger number of bands can be used within the concept of the present invention. Additionally, the present invention can actually operate properly if there are only three bands across the surface of the blade 14. The pattern of bands on the blade 14 will be similar to the color of the bands found on blades 16 and 18. Each of the blades 16 and 18 will use a similar combination of colors of bands and luminescent threads as were illustrated in association with blade 14. Additionally, within the concept of the present invention, the present invention is believed to operate properly if only the luminescent band 28 is extended around the periphery of each of the blades 14, 16 and 18. Still alternatively, it is believed the present invention can operate properly if the white color of each of the blades 14, 16 and 18 will appear in the spaces between the respective color bands.

It can be seen in FIG. 1 that the color band 20 is spaced by an equal distance from the hub 12 on each of the blades 14, 16 and 18. Similarly, the second color band 22 is spaced by an equal distance from the hub 12 on each of the blades 14, 16 and 18. As such, the color on each of the blades will correspond to the same color on another blade. However, within the concept of the present invention, the colors can actually alternate between each of the blades. Each of the color bands should have a similar width.

Figure 2:
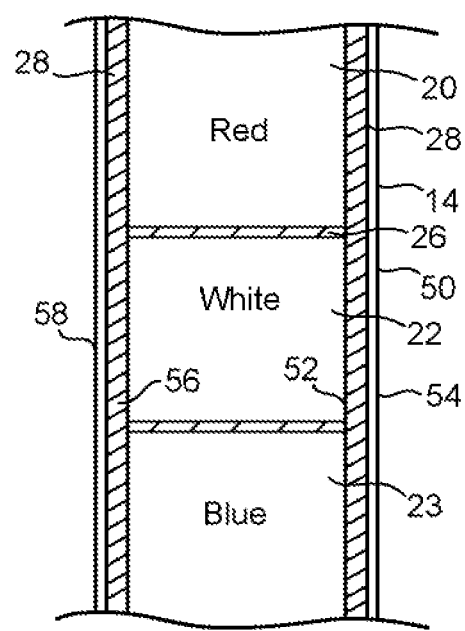
FIG. 2 is a detailed view showing the color separation and luminescent bands on a single a portion of a single blade.

FIG. 2 illustrates a detailed view of the arrangement of colors and luminescent bands on the blade 14. In particular, it can be seen that the first color band 20 is of a red color. The second color band 22 is of a white color. The third color band 23 is of a blue color. The luminescent band 26 is positioned in the space between the first color band 20 and the second color band 22. The luminescent band 28 is illustrated as extending along the periphery 50 of the blade 14. Although FIG. 2 illustrates the luminescent band 28 slightly inwardly of the periphery 50, within the concept of the present invention, this luminescent band 28 can actually be formed on the edge of the blade 14. A luminescent thread 52 extends along side 54 of the blade 14. A luminescent band 56 extends along side 58 of the blade 14. A luminescent thread 52 will have a diameter of approximately 1/32 of an inch. The luminescent band 56 will have a width of 3/4 of an inch. Within the concept of the present invention, it is not important that the luminescent bands have different widths or diameters. Preferably, the luminescent band 28 will be of similar widths or diameters on each side. The illustration of FIG. 2 simply shows the range of diameters or widths that are possible within the concept of the present invention.

In the present invention, the colors and the luminescent bands are used as a technique for intensifying the color separation on each of the blades 14, 16 and 18. This serves to create the red/blue color shift that is prominent in avian navigation. The use of the luminescent bands will enhance the resolution of the colors and will serve to distinguish the color shift. The present invention recognizes the parallax issues associated with avian navigation. The parallax issues deal with the ability to see depth. The present invention enhances parallax by utilizing color, shape and movement of the blades 14, 16 and 18. The luminescent bands create luminescent band boundaries so as to separate the colors and to enhance movement. As such, the luminescent band extends around the boundaries of each of the colors. As the blades 14, 16 and 18 rotate along with the hub 12, the colors will be broken so as to create a "chopping" as viewed by the eyes of the bird. Additionally, the bands are on a tangent line relative to the circumference of the blade so as to create and enhance this chopping effect. This also serves to create a background effect when the birds are flying at a sharp angle with respect to blades. The bird will view the colors of the blades as appearing to move during the rotation of the blades. The arrangement of the colors and the luminescent bands will allow a bird to effectively navigate around the blades 14, 16 and 18. This effectively avoids the maiming and possible death of the birds. As a result, the wind turbine of the present invention is an avian-friendly construction.

The foregoing disclosure and description of the invention is illustrative and explanatory thereof. Various changes in the details of the illustrated construction can be made within the scope of the appended claims without departing from the true spirit of the present invention. The present invention should only be limited by the following claims and their legal equivalents.

I claim:

1. A blade for a wind turbine comprising:
   a surface having a first color band thereon and a second color band and a third color band thereon, said first, second and third color bands having respective spaces therebetween; and
   a luminescent band extending in said spaces between said first, second and third color bands, said first color band being of a different color than said second color band, said first color band being of a red color, said second color band being of a white color, said third color band being of a blue color, said luminescent band extending around a periphery of each of said first, second and third color bands, said first, second and third color bands each being of a color observable by birds.

2. The blade of claim 1, said luminescent band having a width of between 1/32 inch and 3/4 inch.

3. The blade of claim 1, said luminescent band extending tangentially relative to a circumference of the blade.

4. The blade of claim 1, said first, second and third color bands having substantially similar widths respectively.

5. A wind turbine apparatus comprising:
   a first blade having a first color band, a second color band and a third color band thereon, said first, second and third color bands having a respective space therebetween;
   a second blade having a first color band, a second color band and a third color band thereon, said first, second and third color bands of said second blade having a respective space therebetween, said first, second and third color bands being of a color recognizable by birds;
   a third blade having a first color band, a second color band and a third color band thereon, said first, second and third color bands of said third blade having a receptive space therebetween;
   a first luminescent band positioned in the spaces between said first, second and third color bands of said first blade;
   a second luminescent band positioned in the spaces between said first, second and third color bands of said second blade; and
   a third luminescent band positioned in the spaces between said first, second and third color bands of said third blade, said first luminescent band extending around a periphery of said first blade, said second luminescent band extending around a periphery of said second blade, said third luminescent band extending around a periphery of said third blade.

6. The apparatus of claim 5, said first, second and third color bands of said first blade being of different colors, said first, second and third color bands of said second blade being of different colors, and first, second and third color bands of said third blade being of different colors.

7. The apparatus of claim 6, said first color band of each of said first, second and third blades being of a red color, said second color band of each of said first, second and third blades being of a white color, said third color band of each of said first, second and third blades being of a blue color.

8. The apparatus of claim 5, further comprising:
a hub having said first blade, said second blade and said third blade extending radially outwardly therefrom, said first color band of said first, second and third blades being spaced by an equal distance from said hub, said second color band of said first, second and third blades being spaced by an equal distance from said hub, said third color band of said first, second and third blades being spaced by an equal distance from said hub.

9. The apparatus of claim 5, each of said first and second luminescent bands being of a white luminescent material.

* * * * *